United States Patent [19]

Hallack et al.

[11] 4,289,616

[45] Sep. 15, 1981

[54] APPARATUS FOR REMOVING SUSPENDED SOLIDS FROM AN EFFLUENT

[76] Inventors: Richard D. Hallack, 329 Anita Ave., Pasadena, Calif. 91105; Tommie B. Carter, 806 Valencia Mesa Dr., Fullerton, Calif. 92632

[21] Appl. No.: 150,913

[22] Filed: May 19, 1980

Related U.S. Application Data

[63] Continuation-in-part of Ser. No. 777,687, Jun. 25, 1977, abandoned, and Ser. No. 924,373, Jul. 13, 1978, Pat. No. 4,203,836.

[51] Int. Cl.$^3$ .............................................. B01D 33/32
[52] U.S. Cl. .................................. 210/101; 210/258; 210/387; 210/406; 210/408; 210/401
[58] Field of Search .................. 210/86, 97, 101, 104, 210/142, 143, 258, 297, 324, 387, 396, 400, 401, 406, 416 R, 408

[56] References Cited

U.S. PATENT DOCUMENTS

| | | | |
|---|---|---|---|
| 2,026,969 | 1/1936 | Flynn | 210/67 |
| 2,096,176 | 10/1937 | Harrington | 210/400 |
| 2,736,434 | 2/1956 | Yacoe | 210/387 |
| 3,243,044 | 3/1966 | Moll | 210/387 |
| 3,358,834 | 12/1967 | El-hindi | 210/400 |
| 3,559,807 | 2/1971 | Reilly | 210/68 |
| 3,690,466 | 9/1972 | Lee et al. | 210/387 |
| 3,722,682 | 3/1973 | Pistiner | 210/387 |
| 3,899,426 | 8/1975 | Hirs | 210/387 |
| 4,137,062 | 1/1979 | Mullerheim et al. | 210/387 |
| 4,203,836 | 5/1980 | Hallack et al. | 210/387 |

FOREIGN PATENT DOCUMENTS 52-48874  4/1977  Japan .................................. 210/387

*Primary Examiner*—Peter A. Hruskoci
*Attorney, Agent, or Firm*—Christie, Parker & Hale

[57] ABSTRACT

The apparatus herein provides a separation of suspended solids from a liquid containing such suspended solids. The apparatus comprises a base which supports a pan having a bottom wall, a spaced-apart pair of sidewalls extending upwardly and outwardly from the bottom wall and a spaced-apart pair of end walls extending upwardly and outwardly between the sidewalls and from the bottom wall to form an open top container. A perforated plate is secured within the pan to the sidewalls and end walls of the pan above the bottom wall to define a chamber between the bottom wall, an undersurface of the perforated plate, and the surrounding side and end walls. At least one outlet on the bottom wall of the pan is provided for introducing a vacuum to the chamber and for removing liquid from the chamber. A continuous liquid-absorbing medium transfer support extends around the pan and lies within the pan in contact with the perforated plate. The transfer support extends around the end walls of the pan to form a continuous loop around the pan. The transfer support wraps around a roller drive mechanism for providing ease of movement of the transfer support around the pan. A drive mechanism drives the rollers for moving the transfer support about the circular path around the pan. A liquid-absorbing medium comprising an industrial paper toweling having a basis weight from about 28 to about 34 pounds per ream, a caliper from about 0.013 to about 0.0145, an aged wet tensile strength from about 16 to about 25 ounces, and an aged absorption of less than 40 seconds, is positioned on the transfer support on the pan.

10 Claims, 4 Drawing Figures

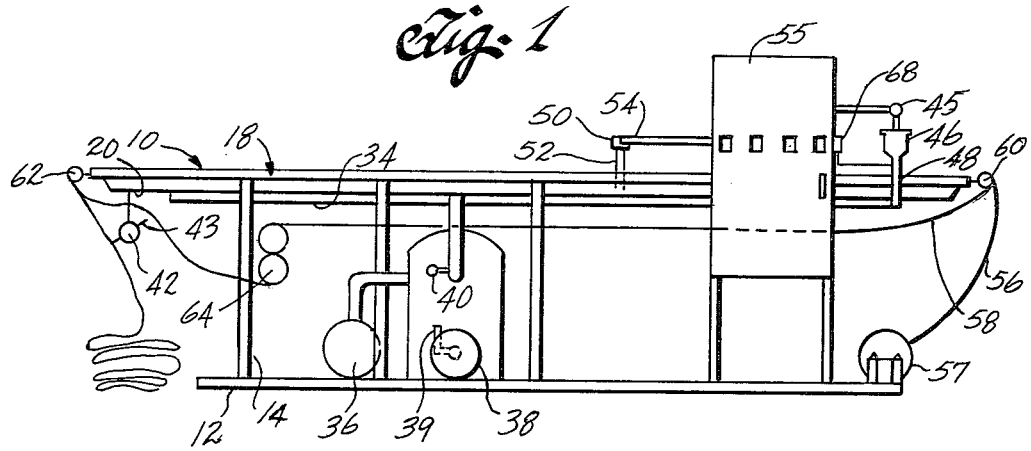
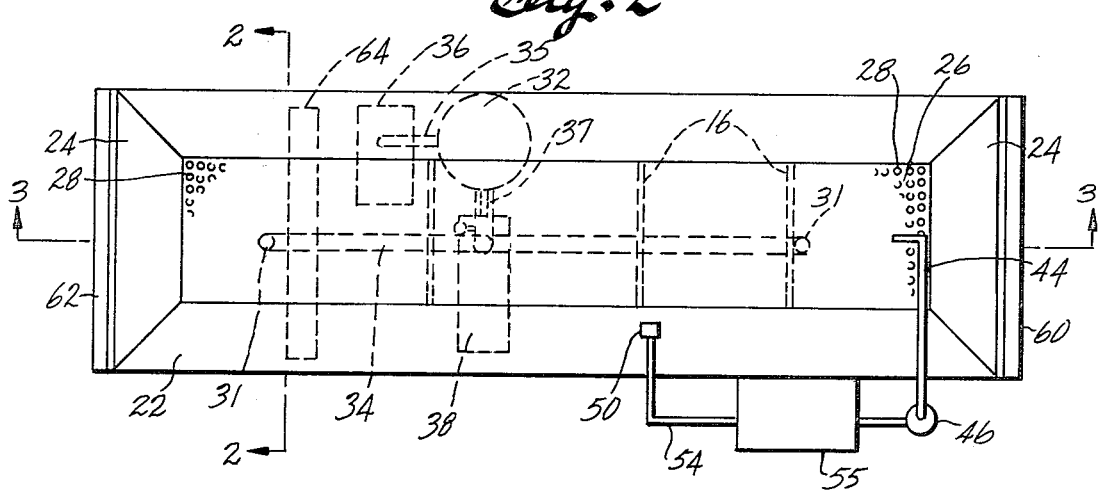

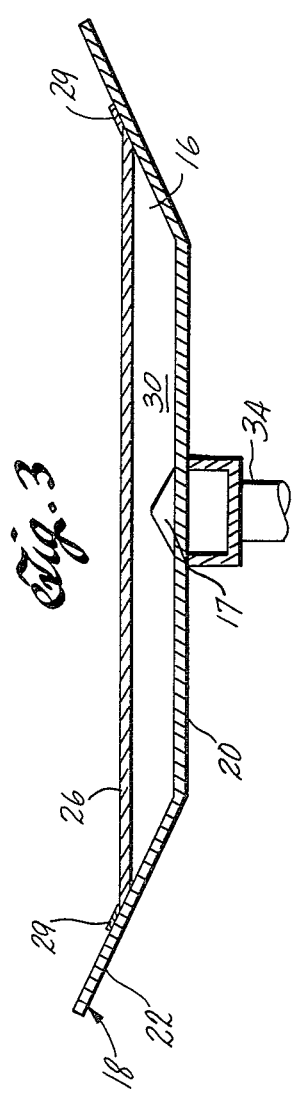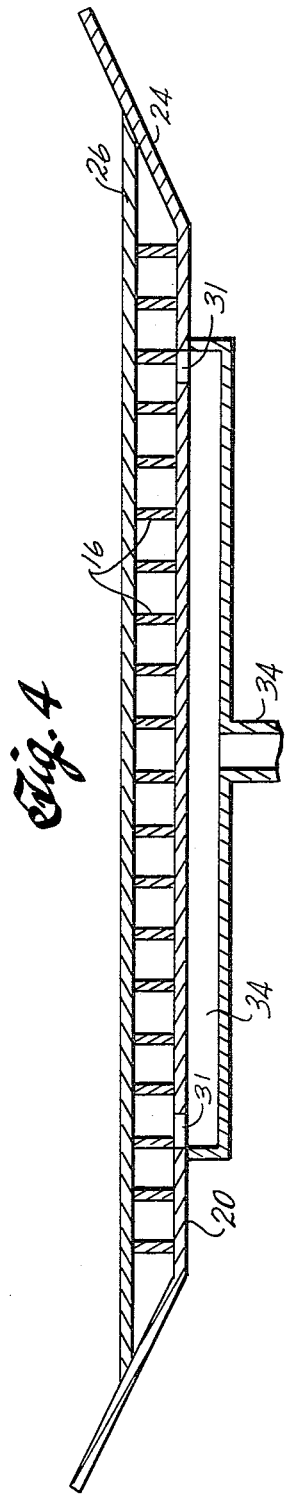

APPARATUS FOR REMOVING SUSPENDED SOLIDS FROM AN EFFLUENT

CROSS-REFERENCE TO RELATED APPLICATIONS

This application is a continuation-in-part of Ser. No. 777,687, filed June 25, 1977 now abandoned, and Ser. No. 924,373, filed July 13, 1978, now U.S. Pat. No. 4,203,836, issued May 20, 1980.

BACKGROUND OF THE INVENTION

There is an ever increasing need to remove solids from liquid streams which can contain solids. Many waste streams from industrial, manufacturing or other processes often contain solids which are undesirable or which can pollute natural waterways if such waste streams are directed into such waterways without complete solids separation.

For example, the separation of precipitated metal hydroxides from effluent water is a most cumbersome and expensive part of metal finishing waste treatment. Precipitated metal hydroxides, such as nickel, chromium, zinc, copper, iron and the like, are bound with water in effluent from plating plants and the like, and the floc of metal hydroxides formed has nearly the same specific gravity as the water. This factor tends to keep the flocculent precipitate in suspension, and it has proven most difficult and time consuming to attempt to settle the precipitated particles in settling tanks. It has been found that the more dilute the waste, the harder it is to settle the precipitated hydroxides. In general, settling tanks require an inordinate amount of time to perform their settling function to any material extent, and are incapable of removing the precipitates in sufficient quantities to satisfy present and proposed government standards with respect to effluent purity. In addition, because of the relatively lengthy time required for settling, it may take an undesirably long time to determine if the effluent from such settling tanks was completely treated to precipitate all the metal ions present as hydroxides. If not, then the effluent has to be retreated with caustic to precipitate the metal ions and then again permitted to settle the metal hydroxides formed. Additives, such as aluminum sulfate, ferric salts, or polyelectrolytes are used in settling processes in an effort to promote the precipitation and settling of the precipitates.

SUMMARY OF THE INVENTION

The apparatus herein has utility in a method for separating suspended solids from a liquid. The method comprises contacting liquid which contains suspended solids with a liquid-absorbing medium. The liquid is absorbed into the liquid-absorbing medium leaving the suspended solids unabsorbed. While such liquid is being absorbed, absorbed liquid is removed from the liquid-absorbing medium at a position away from the unabsorbed solids. The liquid-absorbing medium is provided with two opposing surfaces, one surface for absorption of the liquid and the opposing surface for removal of absorbed liquid. Liquid withdrawn from the liquid-absorbing medium is thereby effectively separated from the unabsorbed solids. Concomitantly with removal of absorbed liquid from the liquid-absorbing medium, additional liquid is absorbed into the liquid-absorbing medium as the absorbing propensity of the liquid-absorbing medium is refreshed by the removal of previously absorbed liquid. The liquid-absorbing medium can selectively absorb the liquid present in a mixture of liquid and suspended solids to the substantial exclusion of absorbing the suspended solids.

The apparatus herein provides a separation of suspended solids from a liquid containing such suspended solids. The apparatus comprises a base which supports a pan having a bottom wall, a spaced-apart pair of sidewalls extending upwardly and outwardly from the bottom wall and a spaced-apart pair of end walls extending upwardly and outwardly between the sidewalls and from the bottom wall to form an open top container. A perforated plate is secured within the pan to the sidewalls and end walls of the pan above the bottom wall to define a chamber between the bottom wall, an undersurface of the perforated plate, and the surrounding side and end walls. At least one outlet on the bottom wall of the pan is provided for introducing a vacuum to the chamber and for removing liquid from the chamber. A continuous liquid-absorbing-medium transfer support extends around the pan and lies within the pan in contact with the perforated plate. The transfer support extends around the end walls of the pan to form a continuous loop around the pan. The transfer support wraps around a roller drive mechanism for providing ease of movement of the transfer support around the pan. A drive mechanism drives the rollers for moving the transfer support about the circular path around the pan. A liquid-absorbing medium comprising an industrial paper toweling having a basis weight from about 28 to about 34 pounds per ream, a caliper from about 0.013 to about 0.0145, an aged wet tensile strength from about 16 to about 25 ounces, and an aged absorption of less than 40 seconds, is positioned on the transfer support on the pan. An inlet conduit is provided for introducing liquid containing suspended solids to the pan onto the liquid-absorbing medium. A valve is provided for selectively introducing the liquid containing suspended solids through the inlet conduit. A liquid-level probe is provided for sensing the level of liquid containing suspended solids in the pan and for activating the valve for introducing liquid containing suspended solids to the pan when the level of liquid is below a selected level. A liquid receiver spaced from the pan and connected to an outlet of the pan by a conduit is secured to the base. The liquid receiver receives the liquid removed from the pan. A vacuum pump supported on the base is connected by a vacuum line to the liquid receiver for creating a reduced pressure in the liquid receiver and in the chamber in the pan. A liquid transfer pump is connected to the liquid receiver for removing liquid from the liquid receiver.

The liquid which has been absorbed by the liquid-absorbing medium can be removed from such liquid-absorbing medium by use of a vacuum. A vacuum is useful in increasing the rate of liquid removal from the absorbing medium and thereby also increasing the rate of absorption of the liquid and rate of solids separation.

Specifically, the apparatus herein can be used to separate a liquid from an effluent liquid stream containing precipitated suspended solids. The liquid waste stream from an electroplating process or metal finishing process, which generally contains precipitated metal hydroxides suspended in water, can especially be treated by the apparatus of this invention. When the apparatus of the present invention is used on such a stream, only little pretreatment of the stream is necessary. There is no need for any additives to promote precipitation or settling. The only pretreatment that is performed is to destroy any cyanides in the effluent, reduce any chromium ions present, and adjust the pH of the effluent to a predetermined value generally greater than a pH of 8.0.

The apparatus of the invention is capable of reducing the metal hydroxide suspended solids in the effluent to a level less than about 25 parts per million (ppm), with no settling time requirements and on an economical basis. Such a low solids content is generally beyond the capabilities of the prior art settling tanks.

The practice of the method in combination with a constructed embodiment of the apparatus of the invention, is capable of reducing the concentration of a precipitated zinc hydroxide in an aqueous suspension from 2,000 ppm to less than 1 ppm, and of reducing the concentration of a precipitated nickel hydroxide from 1,000 ppm to less than 5 ppm. The constructed embodiment has flow rates of the solids-liquid suspension to be treated ranging from about 600 gallons per hour to about 3,000 gallons per hour, depending on the types of suspended solids to be removed, and the concentration of the suspended solids in the liquid.

The apparatus is also capable of separating liquids from liquids due to selective absorption of one of the liquids by the liquid-absorbing medium to the substantial exclusion of absorbing the other liquid. As the liquid-absorbing medium used on the method has a strong affinity for water, an aqueous emulsion containing suspended organic liquids can be treated with the apparatus for separating the water from the organic liquids.

BRIEF DESCRIPTION OF THE DRAWINGS

The apparatus herein will be better understood with regard to the following detailed description and accompanying drawings wherein:

FIG. 1 is a schematic plan view of apparatus for removing suspended solids from an effluent liquid stream constructed in accordance with one embodiment of the invention;

FIG. 2 is a schematic top plan view of the apparatus of FIG. 1;

FIG. 3 is a schematic cross-sectional view taken essentially along the line 2—2 of the pan of the apparatus of FIG. 2; and FIG. 4 is a schematic cross-sectional view taken essentially along the line 3—3 of FIG. 2.

DETAILED DESCRIPTION OF THE INVENTION

The apparatus will be described in relation to the drawings wherein FIG. 1 illustrates a working embodiment of the apparatus for removing suspended solids from a liquid. The apparatus illustrated in FIG. 1 is a preferred embodiment of apparatus for use in removing suspended solids from an aqueous effluent liquid containing suspended solids. For example, the apparatus illustrated in FIG. 1 is the preferred apparatus for separating suspended metal hydroxide particles from water in which they are suspended. Metal hydroxide particles which can be separated by the method and apparatus are the hydroxides of metals such as nickel, zinc, cadmium, copper, chromium and mixtures thereof. Such metals generally can be found in effluent streams from metal finishing or metal plating industrial processes.

The apparatus herein described separates suspended solids from the liquid in which they are suspended by selective absorption of the liquid using a liquid-absorbing medium which absorbs the liquid and leaves the solids substantially unabsorbed. The apparatus can be useful to separate many suspended solids from liquids in which they are contained because of the selective absorptivity of the liquid-absorbing medium. For ease of discussion, the apparatus will be described herein in terms of separating suspended metal solids from water in which they are contained.

Metals, such as nickel, zinc, cadmium, copper and chromium are readily suspended in water by forming the hydroxides of the metals. The metal hydroxides are generally insoluble in water and tend to form floccules having a variety of particle sizes which are suspended in the water. The flocculent precipitate formed by the metal hydroxides in water is difficult to separate from the water due to the fine particle size of some of the floccules and due to the apparent density of the floccules. The apparent density of the floccules is near the density of water. Due to this apparent density, a substantially long period of time is required to settle the flocculent precipitate from the liquid.

With reference to the drawings, the apparatus 10 shown in FIGS. 1 and 2 is supported on a base 12. The base 12 includes vertical support 14 for supporting the apparatus.

The apparatus comprises a pan 18 assembly, hereinafter referred to as a pan. The pan 18 is shown in cross section in FIG. 3. The pan 18 comprises a bottom wall 20, a spaced-apart pair of sidewalls 22 and a spaced-apart pair of end walls 24 between the sidewalls, the sidewalls and end walls extend generally upwardly and outwardly from the bottom wall to form an open-top container.

A perforated plate 26 is secured within the pan. The perforated plate can be secured by spot-welding it to the sidewalls and end walls of the pan. The perforated plate has perforations 28 which extend through the perforated plate for permitting the flow of liquid therethrough. The perforations can be of any geometric shape, such as circles, slots, squares and the like. The size of the openings of the perforations is selected to freely permit the passage of liquid. In a working embodiment having circular perforations extending through a 20 gauge-type 304 stainless steel plate, the openings were ⅛ inch in diameter with their centers 3/16 inch apart.

The perforated plate can be supported by support bars which can be secured to the sidewalls 22 of the pan.

The perforated plate is preferably supported to maintain the perforated plate essentially flat when a vacuum or reduced pressure is formed therebelow. The support bars can be bars that are welded to the sidewalls of the pan at appropriate intervals for maintaining the perforated plate essentially flat. The support bars can be bars, I-beams, rods and plates. Preferably, the support bars are plates 16 (as shown in FIGS. 3 and 4) which rest and are secured on an edge to the bottom wall and which opposite edge engages and supports the perforated plate. When the support bars are plates, such plates can extend partially across the pan leaving an opening for permitting fluid flow along the center of the pan. Alternatively, such plates can be notched with notches 17 or otherwise provided with means for permitting fluid flow along the center of the pan. In a working embodiment illustrated in FIGS. 3 and 4 the support bars were notched steel plates spaced about two inches apart and extending between sidewalls of the pan. Only a few support bars are illustrated in FIG. 2 for simplicity and ease of describing the apparatus therein. If bars, I-beams or rods are used as the support bars, the support bars can be supported by appropriate legs (not shown) which extend from the support bars to the bottom wall of the pan.

The perforated plate 26 is supported or secured to the pan spaced above the bottom wall 20 to form a chamber 30 between the bottom wall, an undersurface of the perforated plate, and the surrounding sidewalls and end walls. The chamber 30 can comprise a plurality of separate chambers such as when the support bars are plates on edge. In such an embodiment the chambers are preferably in fluid communication with one another and alternatively each chamber is in fluid communication with an underlying conduit 34.

At least one outlet 31 extends through the bottom wall. The outlet permits introduction of a partial vacuum or reduced pressure to the chamber 30 and also permits removal of liquid collected in the chamber. Such an outlet 31 is connected by a conduit 34 to a liquid receiver 32 spaced apart from the pan. The conduit 34 can be secured to the outside of the pan below the bottom wall 20. In such an arrangement the conduit 34 can connect to more than one outlet along the bottom wall.

The liquid receiver comprises a container for collecting liquid. The liquid receiver has a vacuum line 35 which is fastened to an upper portion of the liquid receiver. The vacuum line is connected to a vacuum pump 36. The vacuum pump can supply a reduced pressure through the vacuum line 35 to the liquid receiver and through the conduit 34 to the chamber 30 within the pan. The conduit 34 can be provided with a pressure gauge 40 for providing a determination of the reduced pressure in the conduit and chamber 30. The vacuum line 35 is attached to an upper portion of the liquid receiver to prevent liquid from being pulled into the vacuum line and pump.

The liquid collected in the liquid receiver is removed through a liquid transfer conduit 37 attached to a lower portion of the liquid receiver. Liquid is removed by a liquid transfer pump 38 which pumps the liquid from the liquid receiver. In a working embodiment for a 30 gallon system the liquid transfer pump had a potential of 350 gal/min. A check valve 39, such as a ball check valve can be positioned along the liquid transfer conduit 37 for preventing backflow of liquid into the liquid receiver.

The apparatus herein also comprises a liquid-absorbing medium transfer support 58. The transfer support 58 is a continuous belt extending around the length of the pan 18. That is, the transfer support extends around the pan, around rollers 60 and 62 positioned at the end walls of the pan and secured to the pan. In a working embodiment, the transfer support is a 14 mesh polypropylene screen belt about 34 inches wide. The transfer support is a screen to permit the passage of liquid therethrough while concomitantly providing support. The transfer support 58 extends around drive rollers 64 which can be powered to move the transfer support about its closed loop path of travel. During its travel, the transfer support rests against the end walls and sidewalls of the pan and the perforated plate.

Supported and carried by the transfer support 58 is a liquid-absorbing medium 56. The liquid-absorbing medium can be supplied from a roll 57. The liquid-absorbing medium is planar in physical configuration and lies upon the transfer support which contacts the sidewalls 22 and end walls 24 of the pan, effectively sealing the liquid-absorbing medium and transfer support to such side and end walls and thereby preventing any liquid or suspended solids from passing around the edges of the liquid-absorbing medium. A silicone sealant can be coated on the sidewalls 22 and end walls 24. The coating of sealant extends from the perforated plate upwardly along the side and end walls. The transfer support rests on such coating and the coating can enhance the movement of the transfer support across the pan.

The liquid-absorbing medium is a paper having a basis weight from about 28 to about 34 pounds per ream and a caliper from about 0.0130 to about 0.0145 inch, and has a caliper variation of a maximum of about 0.008 inch.

The preferred paper useful as a liquid-absorbing medium is manufactured using a process referred to as a "crepe process." The "crepe process" is a term known to those in the paper manufacturing art which refers to a process of packing pulp fibers and pressing such pulp fibers into a given area. Such pulp fibers are pressed forming the paper by a force exerted at right angles to the plane of the paper being formed. That is, a force is exerted in the direction of the length of the paper to bunch the pulp fibers together. This manufacturing method is contrasted with the "embossing process" wherein a force is exerted at right angles to the plane of the paper being formed. The crepe process provides more pulp fiber per square area (a greater pulp density) than the embossing process. The crepe process also provides ridges and wrinkles in the texture of the paper providing an effective surface area greater than the calculated surface area for a given length and width of such paper. Paper prepared using the crepe process has significant strength due to the pulp density and overlapping of fibers. Therefore, paper manufactured by the crepe process is especially useful in the apparatus herein as the relatively high pulp density provides strength to the paper when the paper is wetted.

The preferred paper for use in the apparatus and which has the above specifications is commercially available and the commercially available paper is acceptable for use in this apparatus. The commercially available paper, generally has the characteristics of industrial paper toweling. The preferred paper has a basis weight of about 31.5 to about 32.0 pounds and a caliper of about 0.0137 to about 0.0142. Additional characteristics of such paper include an aged wet tensile strength from about 16 to 25 ounces. The absorption for such paper unaged is preferably less than 20 seconds and the aged absorption is preferably less than 40 seconds for paper which has been aged five minutes at 300° F. The "W" dry tensile strength for a strip of the paper ½ inch wide by 4 inches long is at least 3.5 pounds and the "A" dry tensile strength for the same dimensioned strip of the paper is at least 1.5 pounds. The paper is prepared by the crepe process from a mixture of ground wood particles and 50% sulfite solution. The pH tray when making the paper from the mixture is maintained at a pH from about 4.8 to about 5.0.

The liquid-absorbing medium is provided on a roll 57 and the roll of such liquid-absorbing medium is mounted at one end of the base 12. The liquid-absorbing medium 56 is drawn from the roll and placed on the continuous transfer support 58 in the dish-shaped container of the pan. The liquid-absorbing medium on the transfer support extends between and up along the sidewalls and over the end walls of the pan. The liquid-absorbing medium completely covers the perforations in the perforated plate and upon being wetted the liquid-absorbing medium clings to the transfer support and pan for effectively preventing liquid from passing around the edges and under the liquid-absorbing medium. If liquid were able to pass around and under the liquid-absorbing medium, solids which could be entrained in that liquid could also pass around and under the liquid-absorbing medium and thereby contaminate the separated liquid in the liquid receiver 32.

A roller 42 is mounted and secured to the pan 18 at the end of the apparatus opposite the roll 57 of liquid-absorbing medium. The roller 42 is provided with at least one blade 43 which extends outwardly from the roller 42. The roller 42 is positioned such that the transfer support and liquid-absorbing medium pass around the roller. The roller is powered by a drive mechanism which causes the roller to revolve and the blade 43 to intermittently strike the liquid-absorbing medium to dislodge solids build-up on the liquid-absorbing medium. The dislodged solids can be collected for subsequent recovery of values contained therein.

A liquid-level probe 50 is mounted on a control panel 55 which is supported on the base 12. The liquid-level probe extends into the container of the pan for sensing the liquid level in the pan. The liquid-level probe can be two electrodes 52 spaced apart which extend into the container of the pan. When the liquid containing suspended metal precipitates is in contact with the electrodes, a current can flow between the electrodes. Such a current flow can be sent to the control panel 55 which, in turn, can control the inflow of the liquid containing dissolved solids.

A valve 46 is provided supported on the base 12 for introducing liquid containing suspended solids to the container of the pan through a liquid inlet 44. The liquid inlet 44 is a conduit which extends partially across the pan for introducing the liquid containing suspended solids to about the middle of the pan.

The valve 46 is preferably a hydraulic valve which, in turn, is operated by a solenoid valve 45. That is, the hydraulic valve provides flow of the liquid containing suspended solids to the pan. Such liquid mixture flows from its source (not shown), such as a settling or pretreatment tank through the inlet conduit 48. The hydraulic valve is normally maintained in the closed position. When the liquid level in the pan falls below the electrodes, appropriate electrical circuits provide a signal to the solenoid valve. Upon activation the solenoid valve provides a charge of fluid, such as water, to the hydraulic valve which then opens permitting the liquid mixture to flow through the valve 46 and the liquid inlet 44, into the pan and onto the liquid-absorbing medium. When the level of liquid again reaches the electrodes, the current flow between electrodes can provide a signal to the solenoid valve to stop the flow of fluid and thereby close the hydraulic valve.

The control panel 55 can also contain appropriate electrical circuitry for controlling the movement of the transfer support and thereto the liquid-absorbing medium. For example, the control panel can operate the apparatus in cycles. A first cycle can be a processing cycle wherein the valve 46 is activated to introduce the liquid containing suspended solids to the pan and on the liquid-absorbing medium. In the first cycle, the vacuum pump is activated to facilitate absorption of the liquid by the liquid-absorbing medium. In the first cycle the valve 46 is continually activated and deactivated to intermittently deliver the liquid containing suspended solids to the pan without overflowing the pan. The second cycle can be a dry-off cycle wherein the vacuum pump is activated to remove absorbed liquid from the undersurface of the liquid-absorbing medium. In the second cycle the valve 46 remains shutoff. A third cycle can be a vacuum break wherein the vacuum pump is shutoff. The forth cycle can be an indexing cycle wherein the drive rollers 64 are activated to move the transfer support and liquid-absorbing medium off the pan to introduce fresh liquid-absorbing medium to the pan.

A liquid-pressure switch 68 can be used to override the automatic functioning of the apparatus. For example, such a liquid-pressure switch 68 can be used to shutoff the inflow of liquid containing suspended solids, if the tank from which such liquid mixture is being obtained becomes empty.

The apparatus has utility for separating suspended solids from the liquid in which they are suspended. A method of separating suspended solids from a liquid containing suspended solids is disclosed in United States Patent Application Ser. No. 924,373, the entire disclosure of which is incorporated herein by this reference.

In such a process, a liquid containing suspended solids is stored in a tank or reservoir. Such a tank can be used for pretreatment of the liquid or can simply be a storage tank. For example, a liquid stream containing dissolved metals can be pretreated for removing the dissolved metals from solution thereby enabling later separation of the liquid from the precipitated solids formed. The effluent liquid stream can be pretreated with a strong base for forming hydroxides of the various metals present, which hydroxides are generally insoluble in an aqueous medium. The tank can also be used as a settling tank to eliminate those solids which can be present in the liquid stream and which can be separated from the liquid by a settling process.

In the practice of the method in regard to the treatment of a liquid effluent stream from a metal processing plant, a preconditioning step is utilized to destroy any cyanides which may be present in the effluent. The pH of the effluent is adjusted to a range from about 10.5 to about 11 and the effluent is chlorinated to destroy any cyanides present. Next, the solution is placed in a pH adjustment tank in which the pH is adjusted to the proper level for the metals present to be precipitated. Appropriate pH values for different metals which can be precipitated and removed by this method are as follows: nickel, 10.5; zinc, 10.0; cadmium, 10.5; copper, 8.25; and chromium, 8.20.

In order to remove chromium metal particles from such an effluent liquid stream, hexavalent chromium is first reduced to trivalent chromium by the use of sodium metabisulfate. The resulting solution is then transferred to the pH adjustment tank and the pH is adjusted to 8.20 for precipitating the chromium.

A quantity of the liquid containing suspended solids is transferred from the tank and fed onto the upper surface of the liquid-absorbing medium in the pan through the inlet conduit and under the control of an appropriate valve 46.

The liquid mixture is flowed onto and thereby contacted with the liquid-absorbing medium which covers the perforations in the perforated plate. The wetted edges of the liquid-absorbing medium provide an effective seal along the sidewalls and end walls of the pan for substantially preventing any of the liquid with suspended solids from passing around the edges of the liquid-absorbing medium and under such medium and subsequently through the perforations.

The liquid is absorbed into the liquid-absorbing medium and the liquid-absorbing medium becomes saturated with the liquid. The liquid is absorbed into the liquid-absorbing medium leaving the suspended solids unabsorbed. Due ot the absorbent properties of the liquid-absorbing medium for liquids, the liquid is absorbed into the liquid-absorbing medium and saturates such medium. After the liquid-absorbing medium has been saturated with the liquid, it can absorb substantially no additional liquid. Therefore, the apparatus is designed for removing absorbed liquid from the liquid-absorbing medium thereby refreshing the absorbent properties of the liquid-absorbing medium. Such elements of the apparatus for removing absorbed liquid include the vacuum pump which has its intake coupled through a vacuum line to the liquid receiver and to the chamber 30 forming a reduced pressure in the chamber. The reduced pressure in the chamber effectively removes liquid from the underside of the liquid-absorbing medium. Without such apparatus for removing absorbed liquid from the liquid-absorbing medium, the absorbed liquid can, by gravity, drip from the liquid-absorbing medium after the medium has become saturated. However, it has been found that use of a reduced pressure in the chamber below the perforated plate increases the volume of liquid which can be absorbed into and removed from the liquid-absorbing medium.

The absorbed liquid being removed from the liquid-absorbing medium passes through the perforations in the perforated plate. The liquid is collected and conveyed from the chamber through the conduit 34 into a liquid receiver 32. The liquid is discharged from the liquid receiver by the liquid transfer pump. This liquid collected in the liquid receiver is substantially free of all suspended solids that were present in the initial liquid mixture fed to the apparatus. For example, such liquid, when the initial liquid feed is an effluent containing metal hydroxide suspended precipitate including such metals as nickel, zinc, cadmium, copper, and chromium from a metal plating process, generally contains less than about 50 ppm of such suspended metals. In operative embodiments of the apparatus, the liquid collected in the liquid receiver has contained less than 20 ppm of such suspended metal solids.

The solid particles in the liquid mixture fed onto the liquid-absorbing medium remain suspended in a thin film of the liquid which forms over the top of the liquid-absorbing medium. The solids remain suspended within the thin film. There is effectively no tendency for the solids to be drawn into the liquid-absorbing medium or to clog the liquid-absorbing medium.

In many solids separation processes, the effectiveness of the separation is related to the build-up of a pack of the solids being separated upon the surface of the separation medium (cake). The pack thereby supplements the separation medium and acts as a medium itself. The apparatus herein does not rely upon the formation of a pack upon the liquid-absorbing medium. Contrarily, any formation of a pack upon the surface of the liquid-absorbing medium prevents that surface area from coming into contact with the liquid to be absorbed, thereby decreasing the capability of the liquid-absorbing medium to absorb the liquid. A pack does not form in the present method of separation until the liquid has been substantially, totally absorbed. That is, the suspended solids essentially remain in suspension until the liquid is absorbed. There appears to be essentially no settling of the suspended solids because of the reduced pressure within the chamber 30. The liquid-absorbing medium, however, even without the pack, is capable of separating solids from liquid suspensions when the solids content is initially very low. The apparatus herein can be operated at partial pressure in the chamber 30 between about 2 to about 24 inches of mercury. Preferably, for throughput considerations, the partial pressure is about 10 inches of mercury.

The apparatus also has utility for separating immiscible liquids. For example, when an aqueous liquid containing immiscible organic liquid is treated using the apparatus, the water is absorbed by the liquid-absorbing medium to the substantial exclusion of absorbing the organic liquids. The water is thereby effectively separated from the organic liquids which remain unabsorbed. This method is, therefore, advantageous over filtration separation methods which are not capable of selectively separating an emulsion of immiscible liquids. Organic liquids are commonly found in waste streams, such as in waste streams from the metal processing and metal plating industries as various additives utilized in such processes.

The invention provides an economical apparatus for removing precipitated suspended solids from a liquid effluent in an economical and expeditious manner. The apparatus provides a quick determination if the solids are being separated. The effluent liquid from the liquid receiver can be monitored to determine the efficiency of separation.

It will be appreciated that although a particular embodiment of the invention has been shown and described, modifications may be made. It is intended in the claims to cover all modifications which come within the true spirit and scope of the invention.

What is claimed is:

1. Apparatus for separating suspended solids from a liquid containing such suspended solids, the apparatus comprising:
   (a) a base;
   (b) a pan supported on the base having a bottom wall, a spaced-apart pair of sidewalls extending upwardly and outwardly from the bottom wall, and a spaced-apart pair of end walls extending upwardly and outwardly between the sidewalls and from the bottom wall to form an open-top container;
   (c) a perforated plate within the pan and secured to the sidewalls and end walls of the pan above the bottom wall to define a chamber between the bottom wall, an undersurface of the perforated plate, and the surrounding side and end walls;
   (d) at least one outlet on the bottom wall of the pan for introducing a vacuum to the chamber and for removing liquid from the pan;
   (e) a continuous liquid-absorbing medium transfer support lying within the pan in contact with the perforated plate and extending across the end walls and forming a loop around the pan;
   (f) roller means for providing ease of movement of the transfer support around the pan;
   (g) drive means for moving the transfer support around the pan;
   (h) a liquid-absorbing medium comprising an industrial paper toweling having a basis weight from about 28 to about 34 pounds per ream, a caliper from about 0.013 to about 0.0145, an aged-wet tensile strength from about 16 to 25 ounces and an aged absorption of less than 40 seconds, positioned on the transfer support on the pan;

(j) means for introducing liquid containing suspended solids to the pan onto the liquid-absorbing medium;

(k) means for sensing the level of liquid containing suspended solids in the pan and for activating the means for introducing liquid containing suspended solids to the pan when the level is below a selected level;

(l) a liquid receiver spaced from the pan and connected to an outlet of the pan by a conduit for removing liquid from the pan to the liquid receiver;

(m) a vacuum pump connected by a vacuum line to the liquid receiver for creating a reduced pressure in the liquid receiver and in the chamber in the pan; and (n) a liquid transfer pump connected to the liquid receiver for removing liquid from the liquid receiver.

2. Apparatus as recited in claim 1 wherein the perforated plate is supported in the pan above the bottom wall by supports secured to the sidewalls of the pan and which extend across the pan.

3. Apparatus as recited in claim 1 wherein perforations in the perforated plate comprise a plurality of circular openings extending through the perforated plate and having a diameter of about ⅛ inch with 3/16 inch centers.

4. Apparatus as recited in claim 1 wherein the transfer support comprises a polypropylene screen formed in a continuous loop wherein the screen is 14 mesh.

5. Apparatus as recited in claim 1 wherein the means for introducing liquid containing suspended solids comprises a hydraulic valve.

6. Apparatus as recited in claim 5 further comprising a solenoid valve adapted to activate or deactivate the hydraulic valve by charging or discharging a fluid to the hydraulic valve which solenoid valve is activated by a signal from the means for sensing the level of liquid containing suspended solids in the pan.

7. Apparatus as recited in claim 1 further comprising means for supporting the perforated plate for maintaining the perforated plate spaced from the bottom wall and essentially flat.

8. Apparatus as recited in claim 7 wherein such support means comprise at least one plate secured on an edge to the bottom wall and on another edge to the perforated plate.

9. Apparatus as recited in claim 1 further comprising means for dislodging solids build-up from the liquid-absorbing medium.

10. Apparatus as recited in claim 9 wherein such solids dislodging means comprises a roller having at least one blade spaced from and secured to the pan which, upon revolving the blade, intermittently strikes the liquid-absorbing medium for dislodging solids from the liquid-absorbing medium.

* * * * *

UNITED STATES PATENT AND TRADEMARK OFFICE
CERTIFICATE OF CORRECTION

PATENT NO. : 4,289,616

DATED : September 15, 1981

INVENTOR(S) : Richard D. Hallack and Tommie B. Carter

It is certified that error appears in the above-identified patent and that said Letters Patent is hereby corrected as shown below:

The term of this patent subsequent to May 20, 1997, has been disclaimed.

Signed and Sealed this

Seventeenth Day of November, 1987

Attest:

DONALD J. QUIGG

Attesting Officer

Commissioner of Patents and Trademarks